US005223351A

United States Patent [19]

Wruck

[11] Patent Number: 5,223,351

[45] Date of Patent: Jun. 29, 1993

[54] DUAL BATTERY SYSTEM

[75] Inventor: William J. Wruck, Shorewood, Wis.

[73] Assignee: Globe-Union Inc., Milwaukee, Wis.

[21] Appl. No.: 792,296

[22] Filed: Nov. 14, 1991

[51] Int. Cl.[5] ........ H01M 2/00; H01M 6/04; H01M 6/42; H01M 12/00

[52] U.S. Cl. ........ 429/9; 429/61; 429/149; 429/204

[58] Field of Search ........ 429/9, 61, 149, 204

[56] References Cited

U.S. PATENT DOCUMENTS 3,475,221 10/1969 Jordan et al. .
3,505,117 4/1970 Christen ........ 429/9
3,607,403 9/1971 Arrance .
4,239,839 12/1980 McDowall et al. .
4,447,504 5/1984 Goebel .
4,684,580 8/1987 Cramer ........ 429/9
4,770,954 9/1988 Noordenbos .
4,883,728 11/1989 Witehira .
5,002,840 3/1991 Klebenow et al. .
5,028,499 7/1991 Pearce et al. ........ 429/61
5,108,848 4/1992 Kramer ........ 429/9
5,162,164 11/1992 Dougherty et al. ........ 429/9

*Primary Examiner*—Wayne Langel
*Attorney, Agent, or Firm*—Foley & Lardner

[57] ABSTRACT

A dual battery system includes a first battery and a second battery electrically connected in parallel to positive and negative terminals. The first battery has an open circuit voltage greater than that of the second battery so that, as current is drawn from both batteries, the amount of current drawn from each respective battery at a given voltage level varies depending on the magnitude of the current. The first battery preferably supplies most of the current at low to moderate current loads, whereas the second battery provides a greater portion of the total current at high current loads. According to one aspect of the invention, wherein the batteries are each lead-acid batteries, the desired difference in open circuit voltage is provided by using sulfuric acid electrolytes of different specific gravities in the two batteries. For this purpose the electrolyte specific gravity of the second battery is preferably at least 0.03 less than that of the first battery.

12 Claims, 1 Drawing Sheet

DUAL BATTERY SYSTEM

TECHNICAL FIELD

This invention relates to dual electric storage batteries having main and auxiliary batteries, particularly to dual lead-acid automotive batteries.

BACKGROUND OF THE INVENTION

Conventional automotive starting, lighting, and ignition (SLI) batteries are 12 volt batteries consisting of six lead acid cells of approximately 2 volts each, connected in series. SLI batteries must respond to three different demands. Engine cranking requires high electric current for short intervals. Ignition at the spark plugs and coil requires lower current rates but for longer periods of time. Everincreasing numbers of vehicle auxiliaries such as lights, clocks, power windows and doors require low current rates, often while the generator is not working, leaving the battery as the only source of electrical energy.

These conflicting demands have evolved the traditional battery, designed mainly for cranking, into dual battery systems having main and reserve units. In one such system, the main battery is connected to the ignition and the reserve battery is connected to auxiliary systems such as lighting. See McDowall et al., U.S. Pat. No. 4,239,839 issued Dec. 16, 1980. The dual battery may have battery cells formed by integrally molded partition walls, as shown in Witehira U.S. Pat. No. 4,883,728 issued Nov. 28, 1989. This battery contains laminated plates of varying thicknesses to provide different discharge characteristics. In Arrance U.S. Pat. No. 3,607,403, issued Sep. 21, 1971, a self-charging battery unit has solid-fluid cell sections actuable to charge cell storage sections when the cell storage sections are discharged.

A variety of switched dual battery systems have been proposed. See, for example, Jordan et al., U.S. Pat. No. 3,475,221, issued Oct. 28, 1969 and Hughes U.S. Pat. No. 3,165,639, issued Jan. 12, 1965. Goebel U.S. Pat. No. 4,447,504, issued May 8, 1984, describes an electrochemical cell with two cell stacks capable of selective operation at one of several possible discharge rates. Noordenbos U.S. Pat. No. 4,770,954, issued Sep. 13, 1988 describes a two-energy source power supply wherein one energy source provides a high current but has a low energy density, and the other provides a low current but has a relatively high energy density. In Klebenow et al. U.S. Pat. No. 5,002,840, issued Mar. 26, 1991, a manual switch is used to bring the reserve battery into parallel with the main battery when needed.

Problems with manual switches include the inconvenience of having to manually engage a switch to access the reserve battery, operator error in using the switch if the vehicle fails to start for an unrelated reason, and operator failure to reverse the switch after the vehicle is started. Switch hardware renders the battery more complex and difficult to manufacture.

Automobiles are designed to accommodate a standard-sized, two-terminal battery. Non-standard battery sizes, remote circuitry, manual or electronic switches, and multiple terminals required by previous dual battery designs can be cost prohibitive. It is of practical and economic value to design a battery which fits the standard arrangements provided by automobile manufacturers, especially if it to be used as a replacement battery. The present invention can provide a two-terminal, standard sized dual battery having many of the same advantages as a switched dual battery system, together with other advantages known dual batteries lack.

SUMMARY OF THE INVENTION

A dual battery system according to the invention includes a first battery and a second battery electrically connected in parallel. The first battery has an open circuit voltage greater than that of the second battery so that, as current is drawn from both batteries, the amount of current drawn from each respective battery at a given voltage level varies depending on the magnitude of the current. The first battery preferably supplies most of the current at low to moderate current loads, whereas the second battery provides a greater portion of the total current at high current loads. According to one aspect of the invention, where the batteries are each lead-acid batteries, the desired difference in open circuit voltage is provided by using sulfuric acid electrolytes of different specific gravities in the two batteries. For this purpose the electrolyte specific gravity of the second battery is preferably at least 0.03 less than that of the first battery.

BRIEF DESCRIPTION OF THE DRAWINGS

Preferred exemplary embodiments of the invention will be described in conjunction with the drawings, wherein like numerals denote like elements, and.

DETAILED DESCRIPTION

Figure 1:
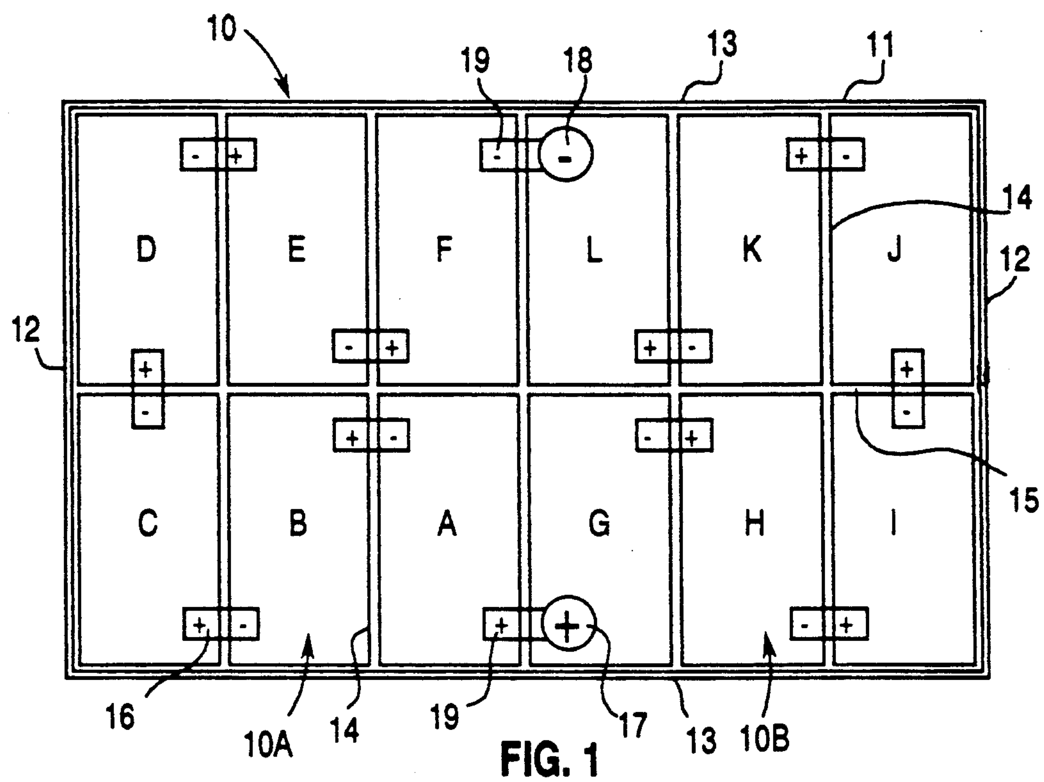
FIG. 1 is a schematic diagram of a battery according to the invention with the container lid removed.

Referring to FIG. 1, a dual battery 10 of the invention includes a standard SLI rectangular plastic battery container 11 having end walls 12, side walls 13 and a flat bottom divided into cell compartments by five, evenly spaced, parallel, integrally molded partition walls 14 which run parallel to end walls 12. A further partition wall 15 runs parallel to side walls 13 and bisects walls 14, providing twelve rectangular cell compartments A through L of equal size. Conventional alternating positive and negative lead-acid battery plates spaced by separators are disposed within the compartments together with a sulfuric acid electrolyte to form the cells. Cells A to F are connected in series by lead straps 16 to form the primary (first) battery 10A, and cells G to L are similarly connected in series by further lead straps 16 to form the secondary (second) battery 10B. Primary battery 10A is connected in parallel to secondary battery 10B at positive terminal 17 between cells A and G, and at negative terminal 18 between cells F and L by electrically conductive connectors 19 which extend through or over the associated plastic partition walls.

Figure 2:
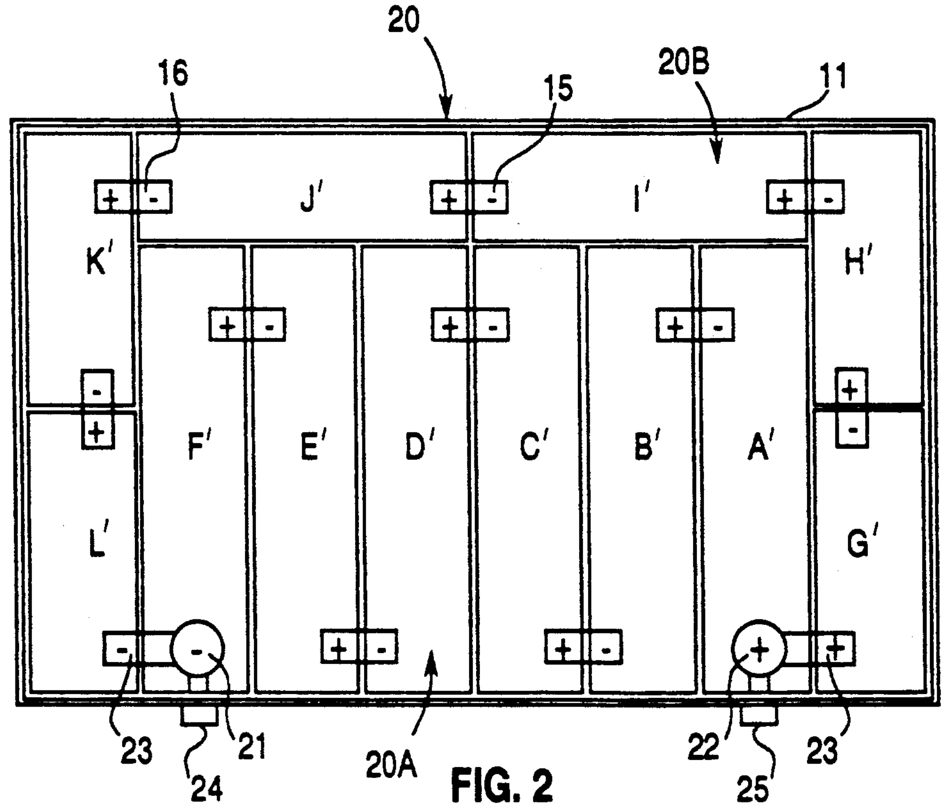
FIG. 2 is a schematic diagram of an alternative embodiment of the battery of the invention.

An alternative embodiment of a dual battery 20 is shown in FIG. 2. Cells A' to F' of the primary battery 20A are connected by connectors 23 in parallel to cells G' to L' of the secondary battery 20B at top mount positive terminal 21 and negative terminal 22. Cells G' to L' of the secondary battery 20B are connected end-to-end in a U-shaped formation surrounding three sides of primary battery 20A. Side mount terminals 24, 25 can be directly connected to the associated top mount terminals 21, 22 in the manner illustrated in commonly-assigned Dougherty et al. U.S. Pat. No. 5,162,164, issued Nov. 10, 1992, the entire contents of which are incorporated by reference herein. This orientation maximizes the amount of plate surface available in both the main and secondary batteries for the illustrated standard SLI container.

In both orientations, cells of the primary and secondary batteries are arranged so that the positive and negative terminations of each battery are near each other. A single connector can be used to maintain mechanical and electrical contact between batteries, eliminating the need for bus bars which span long distances and cause ohmic transmission losses. The illustrated embodiments readily conform to standard housing and terminal configurations. An automatic or manual switch with charging by-pass circuit may be provided for either embodiment as taught by Klebenow et al. U.S. Pat. No. 5,002,840, issued Mar. 26, 1991, and Pierson et al. commonly-assigned U.S. patent application Ser. No. 07/656,772, filed Feb. 15, 1991, the contents of which are incorporated by reference herein.

In a preferred embodiment of the dual battery of the invention, the primary and secondary batteries are lead-acid batteries, each having 6 cells connected in series, the batteries being connected in parallel to comprise a 12 volt battery. The primary battery 10A or 20A is designed for cycle life and high reserve capacity by the use of thicker, denser plates. Each primary battery cell preferably contains from 3 to 15 positive and 3 to 15 negative plates, preferably 5 positive and 6 negative. Primary plate thickness is generally in the range of 0.08 to 0.30 cm, preferably about 0.20 cm.

The secondary battery 10B or 20B may be designed for maximum high rate performance with minimal cycling by use of multiple, thin plates. Secondary cells contain from 3 to 15, preferably 5 positive plates, and from 3 to 15, preferably 5 negative plates. Plate thickness for the secondary battery ranges from 0.06 to 0.30 cm, preferably 0.11 cm.

Partial "switching" between the primary and secondary batteries of the invention is accomplished chemically, i.e., without need for a mechanical or electronic switch, variable resistors, diodes or the like to connect the primary and/or secondary batteries to the battery terminals. Both batteries remain connected in parallel to the terminals, but each responds differently to high and low electrical current demands. The primary, higher resistance battery supplies most of the current at low to moderate operating current demands, whereas the amount of current supplied by the secondary, lower resistance battery increases at high cranking current loads. For this purpose the secondary battery may be a bipolar lead-acid battery, e.g., of the type exemplified in Biddick U.S. Pat. No. 4,098,967, issued Jul. 4, 1978 or Bullock et al. U.S. Pat. No. 5,045,170, issued Sep. 3, 1991, the contents of which are incorporated herein by reference. It is the difference in electrolyte specific gravity which results in the "switching" effect.

The electrolyte of the primary battery has a greater specific gravity than the electrolyte of the reserve battery. This difference causes the two batteries to discharge at different rates when connected to common positive and negative terminals, depending on the rate of discharge. For this purpose the electrolyte of the primary battery preferably has a specific gravity at least 0.03, generally 0.03–0.1 greater than that of the secondary battery. In particular, the specific gravity of the electrolyte of the primary battery preferably ranges from 1.27 to 1.30, particularly about 1.285. Specific gravity of the secondary battery, by contrast, most often ranges from 1.20 to 1.24, particularly about 1.220. Sulfuric acid conductivity peaks at 1.22 and significantly decreases below 1.20. Above 1.30, the high acid concentration causes deterioration of the plates and deep discharges which adversely affect battery life.

While charging or at open circuit, the secondary battery recharges to a state of charge (SOC) higher than the primary battery SOC, preferably at least about 25% higher than the SOC of the primary battery if the secondary battery is not fully charged. The lower gravity secondary battery will tend to remain fully charged even as the high gravity primary battery is cycled down to 75% SOC. The higher open circuit voltage (OCV) of the primary battery causes it to discharge faster than the secondary battery, while requiring a larger potential to recharge it. Correspondingly, at an open circuit or at a low rate of charge, the primary battery spontaneously recharges the secondary battery, advantageously reducing cycling and maintaining the secondary battery at a higher state of charge.

The OCV difference, generally at least 200 mV (0.2 V), generally in the range of 200 to 600 mV, is insignificant at high overvoltages associated with high currents, and the current is then distributed between the primary and secondary batteries primarily by the battery resistances. In particular, ohmic losses (about 4 volts) predominate at cold cranking discharge rates, negating the OCV difference and thereby causing the secondary battery to supply a greater proportion of the current.

For automotive applications, the primary battery according to the invention preferably has a reserve capacity of at least 20 minutes, generally in the range of 40 to 100 minutes, a cold crank rating of at least about 250 amps at 0° F., preferably in the range of 300 to 500 amps at 0° F., and a resistance in the range of 2 to 10 mΩ. The secondary battery should have a reserve capacity of at least 10 minutes, generally in the range of 20 to 50 minutes, a cold crank rating of at least about 200 amps at 0° F., preferably in the range of 250 to 400 amps, and a resistance in the range of 1 to 12 mΩ. Total cold cranking amps (CCA) of the battery is at least about 450 A for automotive battery applications.

The primary battery most preferably provides about 50–95% of the current and the secondary battery provides 5–50% of the current at states of charge ranging from 30 to 100%. This combination provides an automotive battery with superior characteristics as demonstrated in the examples below.

It will be appreciated by those skilled in the art that further adjustments to grid lead alloy composition, electrode chemistry, and plate number and size are contemplated for particular applications. For example, current acceptance may be increased by increasing the antimony content of the grid lead alloy, which may be useful for batteries operated in cold climates. Warm climates require cell structures having greater corrosion resistance and need less current acceptance.

In an alternate embodiment of a dual battery system of the invention, any number of identical batteries are connected in two series. The two series of batteries are connected in parallel to positive and negative terminals. The preferential charge/discharge effect can be obtained if different numbers of batteries are employed in each group to form a primary and secondary battery as a composite of the batteries of each group. The specific gravity of the electrolyte of the cells in each group can be the same or different.

The dual battery of the invention provides a number of advantages over known dual battery designs. Battery cell orientation as described above allows use of standard size battery housings and standard two-terminal configurations. The ability to chemically direct current between primary and secondary batteries can be used in lieu of mechanical or electronic switches, or can be used to enhance the performance of a battery having such a switch.

The primary battery of the invention provides reserve capacity, deep cycling and life, and supplies a large majority of the current at low discharge rates and under cycling. The secondary battery provides starting power at a higher state of charge than the primary battery. The battery of the invention has increased life due to the design of the primary battery (plate sizes, etc.), better cranking performance at reduced states of charge as compared to a standard dual battery, improved cold temperature charge acceptance, and greater reliability, i.e., the battery is less subject to sudden failure. These advantages are demonstrated in the examples which follow.

EXAMPLE 1

A modified marine lead-acid battery comparable to the type disclosed in Klebenow et al. U.S. Pat. No. 5,002,840 (a modified marine Interstate X2 Booster battery) with its reserve battery permanently connected through a current shunt was discharged at room temperature at a controlled current of −25 amps. At battery states of charge of 100%, 90%, 75%, 50%, 25% and 10%, the current range was scanned from −1 to −300 amps discharge and 100 to 1 amp charge. The percent current carried by the primary battery was measured over this current range. The battery was also operated in the laboratory vehicle simulator over a city/highway drive cycle. Table 1 summarizes the battery configuration and the performance of each component under different test conditions.

TABLE 1

| | Primary | Secondary | Total |
|---|---|---|---|
| Specific Gravity | 1.288 | 1.220 | 1.267 |
| Rated Reserve Capacity (Minutes) | 80 | 35 | 115 |
| Rated Cold Crank (Amps) | 450 | 275 | 725 |
| Resistance (mΩ) | 5.56 | 6.0 | 2.9 |
| Reserve Capacity (Amps @≈90% SOC) | -23.0 | -2.1 | -25.1 |
| High Rate @-300 (Amps @≈90% SOC) | -181 | -121 | -302 |
| Average Drive (Amps, discharge @95% SOC) | -14.1 | -1.2 | -15.3 |

At a reserve capacity discharge rate, the primary battery provided −23.0 out of −25.1 amps, almost 92% of the current when the net battery SOC was 90%. The primary battery continued to carry the large majority of the current until the battery SOC dropped below 75%. At a −302 amps discharge rate and a net SOC of 90%, the primary battery carried 60% of the current. This dropped to 52% of the current as the battery discharged; 52% is the expected value based on the battery resistance ratio. During a drive cycle at about 95% SOC, the primary battery provided an average of −14.1 amps over an average discharge current of −15.3 amps, or 92% of the current. Charging currents were also disproportionately higher for the secondary battery at charge currents below 30 amps. The primary battery was observed to recharge the secondary battery at open circuit and low charge rates.

EXAMPLE 2

To test the benefits of a dual acid gravity system of the invention under reduced SOC conditions, repeated cold crank testing at 0° F. was performed as battery charge was reduced. The same type of battery as described in Example 1, having a permanent connection between primary and secondary batteries, was tested against an identical battery of the invention wherein the specific gravities of the electrolyte were modified in accordance with Example 1.

Consecutive −725 amp cold cranks were done at 100%, 90%, 80%, 75% and 70% SOC, with a day of cold rest between tests. Enough cold temperature recharge was given after each test to bring the batteries up to the next desired test level. The battery voltage and one positive and negative half cell from each battery were monitored during each cold crank test. The secondary battery current contribution was also monitored using a clamp-on ammeter.

The secondary battery of the unmodified battery initially carried about 300 amps and slowly dropped off to about 275 amps at 7.2 volts. At 100% SOC, the modified battery showed a sharper secondary current drop to about 225 amps. At a lower SOC, however, the current from the modified secondary battery dropped off more slowly, minimizing the capacity loss associated with reduced SOC such that it outperformed the unmodified standard battery at the same SOC. Table 2 shows the discharge time to 7.2 volts at 725 CCA, 0° F. for both batteries. The higher-charged secondary battery added about ⅓ of a volt to the modified battery at 70% SOC.

TABLE 2

| State of Charge | Standard Battery | Modified Battery |
|---|---|---|
| 100% | 27.8 Seconds | 23.5 Seconds |
| 90% | 16.1 Seconds | 16.9 Seconds |
| 80% | 9.0 Seconds | 10.3 Seconds |
| 75% | 6.8 Seconds | 8.4 Seconds |
| 70% | 3.8 Seconds | 6.6 Seconds |

EXAMPLE 3

To test the charging benefits of a dual battery of the invention against a standard X2 battery during simulated drives, two consecutive ½ hour city/highway test drives were performed at 20° F. using the same batteries as described in Example 2. The dual gravity battery was shown to recharge at a faster rate than the standard battery, as shown in Table 3:

TABLE 3

| | Invention | Standard |
|---|---|---|
| Initial SOC at Start of "Driving" | 50.0% | 50.0% |
| SOC After ½ Hour with 75 A Alternator | 59.6% | 57.6% |
| SOC After ½ Hour with 100 A Alternator | 70.2% | 66.6% |
| Average Charge Current with 75 A Alternator | 9.2 A | 7.3 A |
| Average Charge Current with 100 A Alternator | 10.2 A | 8.6 A |

The benefit in charging rate in the first half hour was 26% for the 75 A alternator and 22% for the 100 A alternator.

It will be understood that the foregoing description is of preferred exemplary embodiments of the invention, and that the invention is not limited to the specific forms shown. Various other substitutions, changes, modifications and omissions may be made in the design and arrangement of the invention without departing from the scope of the invention as expressed in the appended claims.

I claim:

1. A dual battery system, comprising:

a primary first battery having a first open circuit voltage, the first battery including a first positive electrode, a first negative electrode, and a first electrolyte;

a second battery having a second open circuit voltage less than the first open circuit voltage, the second battery including a second positive electrode, a second negative electrode, and a second electrolyte stored separately and isolated from the first electrolyte;

a pair of positive and negative terminals; and electrical connections connecting the first and second batteries in parallel to the terminals so that, as current is drawn from the batteries, the amount of current drawn from each respective battery at a constant voltage level varies with the magnitude of the current.

2. The dual battery system of claim 1, wherein the first open circuit voltage is at least 0.2 V greater than the second open circuit voltage.

3. The dual battery system of claim 1, wherein the first and second batteries are lead-acid batteries.

4. The dual battery system of claim 1, wherein the first battery supplies from 50 to 95% of total current and the second battery supplies from 5 to 50% of total current at states of charge from 30 to 100%.

5. A dual battery system, comprising:

a battery housing;

a pair of positive and negative terminals extending from the housing;

a first battery disposed within the battery housing and including first battery elements, the first battery elements each comprising alternating positive and negative plates immersed in a first sulfuric acid electrolyte, the first battery further including first connections electrically connecting the first elements in series and connecting the first series at opposite ends to the terminals;

a second battery disposed within the battery housing and including second battery elements, the second battery elements each comprising alternating positive and negative plates immersed in a second sulfuric acid electrolyte having a specific gravity lower than the first electrolyte by at least about 0.03, the second battery further including second connections electrically connecting the second elements in series and connecting the second series at opposite ends to the terminals, whereby the amount of current drawn from each respective battery at a constant voltage level varies with the magnitude of the current.

6. The dual battery system of claim 5, wherein the first and second sulfuric acid electrolytes have specific gravities in the range of from 1.2 to 1.3.

7. The dual battery system of claim 5, wherein the specific gravity of the first sulfuric acid electrolyte is in the range of 1.27–1.3, and the specific gravity of the second sulfuric acid electrolyte is in the range of 1.20–1.24.

8. The dual battery system of claim 7, wherein plates of the first battery elements are thicker than plates of the second battery elements.

9. The dual battery system of claim 8, wherein the second battery elements contain more plates than the first battery elements.

10. The dual battery system of claim 5, wherein the second battery is a bipolar battery.

11. The dual battery system of claim 5, wherein the first battery supplies from 50 to 95% of total current and the second battery supplies from 50 to 95% of total current at states of charge from 30 to 100%.

12. The dual battery system of claim 11, wherein the second battery, at open circuit or during recharging, remains at a state of charge at least about 25% higher than the first battery when the second battery is less than fully charged.

* * * * *